US010855595B2

(12) United States Patent
Jayakumar et al.

(10) Patent No.: US 10,855,595 B2
(45) Date of Patent: Dec. 1, 2020

(54) SIMULATED FIBRE CHANNEL TRUNKING SYSTEM

(71) Applicant: Dell Products L.P., Round Rock, TX (US)

(72) Inventors: Avinash Jayakumar, Tamil Nadu (IN); Ramesh Kumar Subbiah, Tamil Nadu (IN); Vibin Varghese, Tamil Nadu (IN); Praveen Sridhar, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 140 days.

(21) Appl. No.: 16/144,037

(22) Filed: Sep. 27, 2018

(65) Prior Publication Data

US 2020/0106720 A1 Apr. 2, 2020

(51) Int. Cl.
*H04L 12/803* (2013.01)
*H04L 12/709* (2013.01)
*H04L 12/781* (2013.01)
*H04L 29/06* (2006.01)
*H04L 12/891* (2013.01)
*H04L 12/931* (2013.01)
*H04L 12/26* (2006.01)
*H04L 12/911* (2013.01)

(52) U.S. Cl.
CPC ............ *H04L 47/125* (2013.01); *H04L 43/02* (2013.01); *H04L 45/245* (2013.01); *H04L 45/52* (2013.01); *H04L 47/41* (2013.01); *H04L 49/351* (2013.01); *H04L 49/357* (2013.01); *H04L 49/60* (2013.01); *H04L 69/08* (2013.01); *H04L 47/827* (2013.01)

(58) Field of Classification Search
CPC ..... H04L 47/125; H04L 47/41; H04L 47/827; H04L 43/02; H04L 49/60; H04L 49/351; H04L 49/357; H04L 69/08; H04L 45/52; H04L 45/245
See application file for complete search history.

(56) References Cited

U.S. PATENT DOCUMENTS

| 9,450,877 | B1 * | 9/2016 | Kamisetty | H04L 47/125 |
| 2014/0269745 | A1 * | 9/2014 | Johnson | H04L 45/745 370/401 |
| 2016/0050277 | A1 * | 2/2016 | Kirk | H04L 67/1097 370/392 |
| 2018/0331977 | A1 * | 11/2018 | Krishnasamy | H04L 45/245 |

* cited by examiner

*Primary Examiner* — Joshua Kading
(74) *Attorney, Agent, or Firm* — Haynes and Boone, LLP (57) ABSTRACT

A FC networking system includes a first FC networking device that is coupled to a FC storage system. A second FC networking device is coupled to a server device and includes a first FC PHY converter that is coupled to the first FC networking device via a first and a second FC link. The second FC networking device also includes an Ethernet switch processor that is coupled to the first FC PHY converter via a plurality of Ethernet links. The Ethernet links include a first Ethernet link that is mapped to the second FC link and a second Ethernet link that is mapped to the third FC link. The second FC networking device groups the first Ethernet link with the second Ethernet link to provide an aggregated interface, and load balances FCoE traffic between the first Ethernet link and the second Ethernet link.

19 Claims, 6 Drawing Sheets

SIMULATED FIBRE CHANNEL TRUNKING SYSTEM

BACKGROUND

The present disclosure relates generally to information handling systems, and more particularly to simulating Fibre Channel (FC) trunking in information handling systems using Ethernet links.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems provide a Fibre Channel (FC) Storage Area Network (SAN) for the storage of data. In such systems, an FC switch may be utilized to couple the FC SAN to servers via a Fibre Channel Forwarder (FCF) that performs FC over Ethernet (FCoE)-to-FC protocol conversions on Ethernet communications sent from the servers to the FC SAN, as well as FC-to-FCoE protocol conversions on FC communications sent from the FC SAN to the servers. Such FCFs allow servers that communicate via the Ethernet protocol to utilize FC SANs that communicate via the FC protocol. In addition, the FCFs may allow servers to communicate via the FC protocol as well. However, the conventional functionality of such FCFs raises a number of issues.

For example, servers in such systems may utilize a Converged Network Adapter (CNA) to communicate with an N_Port ID Virtualization (NPIV) Proxy Gateway (NPG) in the FCF in order to provide login communication for logging into the FC SAN, with the FCF converting those login communications, and the NPG providing the converted login communications to the FC switch in order to log the server into the FC SAN. The NPG may establish links with the FC switch via, for example, a plurality of virtual uplinks with servers on each physical link provided between the NPG and the FC switch, and may operate to load balance logins received from servers via those links. As such, each of the physical FC links between the NPG and the FC switch may be trunked or otherwise grouped together as a single interface such that traffic between the NPG and the FC switch can be load balanced between the physical FC links. However, in conventional FC SANs, trunking the FC links between the NPG and the FC switch require FC level handshaking operations such as logging in the various N_Ports on the NPG with the F_Ports on the FC switch. This requires an expensive and proprietary FC switch chip.

Accordingly, it would be desirable to provide an improved Fibre Channel trunking system.

SUMMARY

According to one embodiment, an Information Handling System (IHS) includes a plurality of Fibre Channel (FC) ports; a first FC PHY converter that is coupled to the plurality of FC ports; a processing system that includes an Ethernet switch processor that is coupled to the first FC PHY converter via a plurality of Ethernet links that include: a first Ethernet link that is mapped to a first FC port of the plurality of FC ports and that is provided between the Ethernet switch processor and the first FC PHY converter; and a second Ethernet link that is mapped to a second FC port of the plurality of FC ports and that is provided between the Ethernet switch processor and the first FC PHY converter; and a memory system that is coupled to the processing system and that includes instructions that, when executed by the processing system, cause the processing system to provide a grouping engine that is configured to: group the first Ethernet link with the second Ethernet link to provide an aggregated interface; and load balance Fibre Channel over Ethernet (FCoE) traffic that is provided by the Ethernet switch processor between the first Ethernet link and the second Ethernet link.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
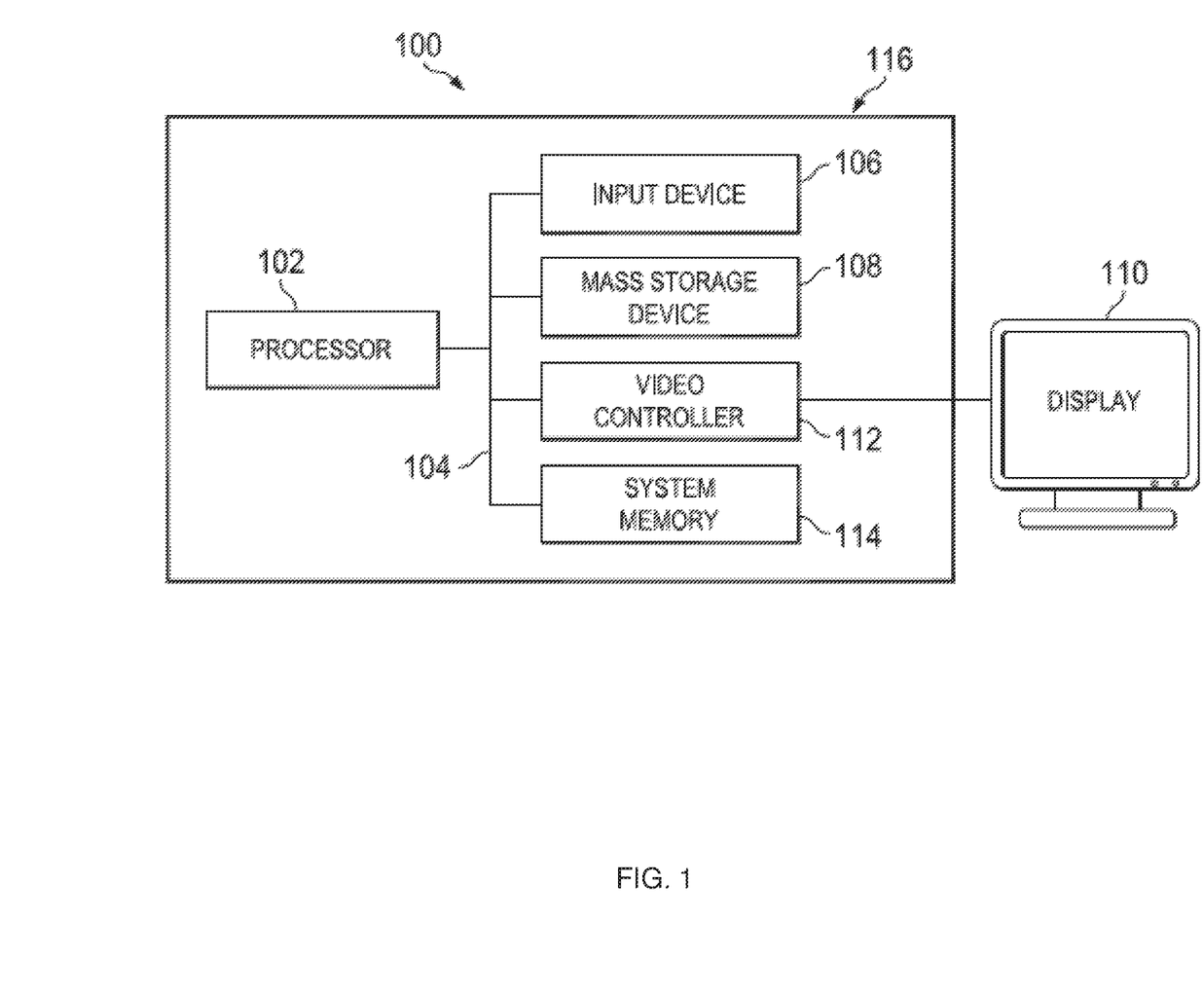
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
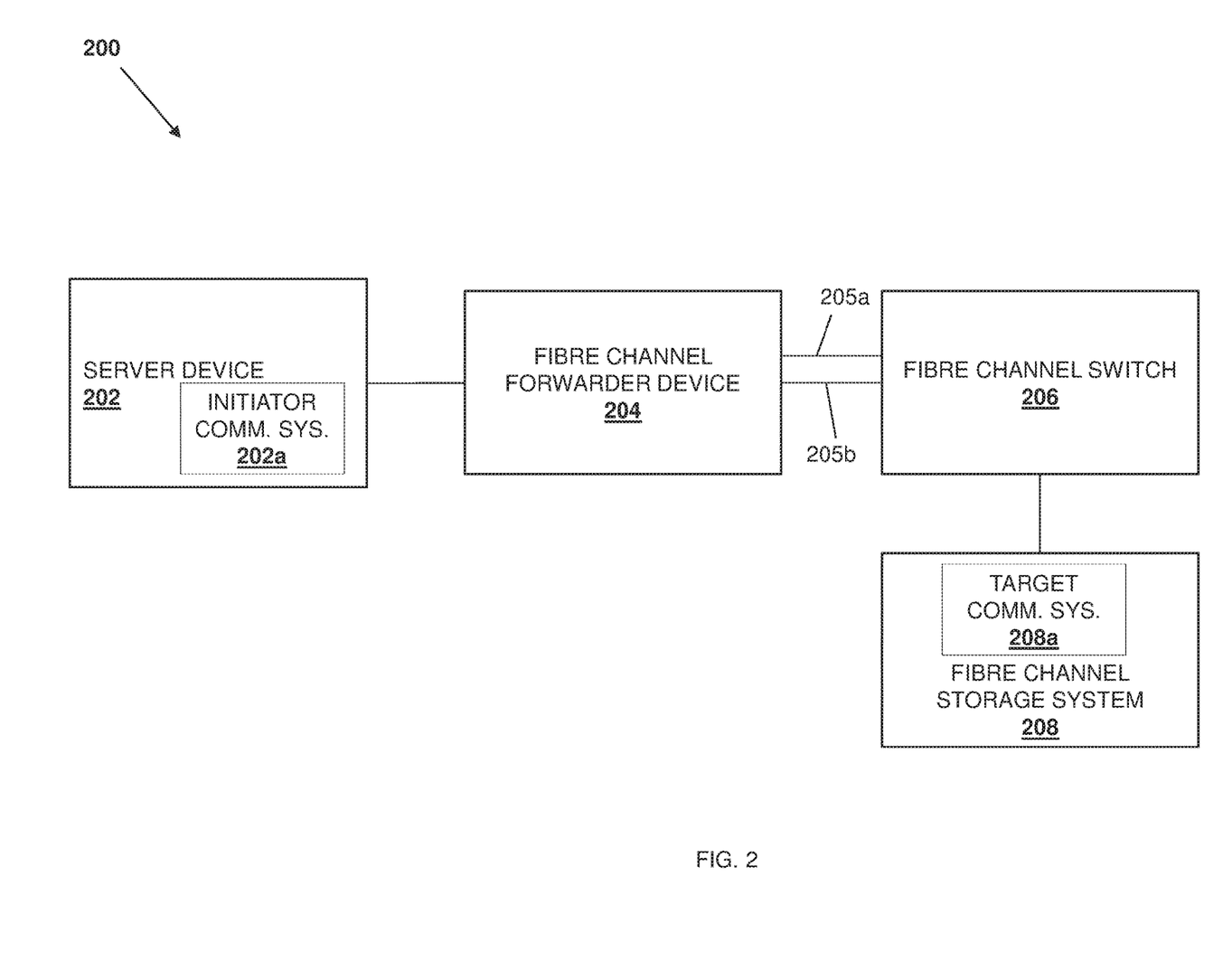
FIG. 2 is a schematic view illustrating an embodiment of a simulated Fibre Channel (FC) trunking system.

Referring now to FIG. 2, an embodiment of a simulated Fibre Channel (FC) trunking system 200 is illustrated. In the illustrated embodiment, the simulated FC trunking system 200 includes a server device 202 that may be the IHS 100 discussed above with reference to FIG. 1 and/or that may include some or all of the components of the IHS 100. For example, the server device 202 may be one or more servers in a server rack or server chassis, and one of skill in the art in possession of the present disclosure will recognize that any number of servers may be provided in the simulated FC trunking system 200 and may operate similarly to the server devices discussed below. In the illustrated embodiment, the server device 202 is coupled to a Fibre Channel Forwarder (FCF) device 204 that may be the IHS 100 discussed above with reference to FIG. 1 and/or that may include some or all of the components of the IHS 100. For example, the FCF device 204 may be provided by a switch or other networking device that is configured to receive Ethernet communications from the server device 202, convert those Ethernet communications to Fibre Chanel (FC) communications for forwarding to an FC Storage Area Network (SAN), receive FC communications from the FC SAN, convert those FC communications to Ethernet communications for forwarding to the server device 202, and/or perform other FCF device functionality that would be apparent to one of skill in the art in possession of the present disclosure. In another example, the FCF device 204 may be configured to receive FC communications from the server device 202 and forward those FC communications to an FC SAN. In such an example, and as discussed below, the FCF device 204 may include an Ethernet switch processor that is configured to perform the switching functionality for FC communications by converting those FC communications received from the server device 202 to FCoE communications, processing the FCoE communications using an Ethernet switch processor rather than a FC switch processor, converting the processed FCoE communication back to FC communications, and forwarding those FC communications to the FC SAN.

In the illustrated embodiment, the FCF device 204 is coupled via a plurality of FC links (e.g., an FC link 205a and an FC link 205b) to an FC switch 206 that may be the IHS 100 discussed above with reference to FIG. 1 and/or that may include some or all of the components of the IHS 100. For example, the FC switch 206 may be provided by a switch that is configured to receive FC communications (e.g., initialized by the server device 202) from the FCF device 204, log the server device 202 into an FC SAN, subsequently receive FC communications (e.g., initialized by the server device 202) from the FCF device 204 to allow the server device 202 to communicate with the FC SAN, and perform a variety of other FC switch functionality that would be apparent to one of skill in the art in possession of the present disclosure. In the illustrated embodiment, the FC switch 206 is coupled to an FC storage system 208 that may be the IHS 100 discussed above with reference to FIG. 1 and/or that may include some or all of the components of the IHS 100. For example, the FC storage system 208 may be provided by a FC SAN that is configured to receive FC communications from the server device 202 through the FC switch 206, send FC communications to the server device 202 through the FC switch 206, and/or perform a variety of other FC storage system functionality that would be apparent to one of skill in the art in possession of the present disclosure.

In the illustrated embodiment, the server device 202 includes an initiator communication system 202a that may include a Host Bus Adapter (HBA) for FC communications, a Network Interface Controller (NIC) that provides Fibre Channel over Ethernet (FCoE) communications, a Converged Network Adapter (CNA) that includes both an HBA and a NIC, and/or any other communication system that is configured to provide FCoE communications and/or FC communication. The initiator communication system 202a may be coupled to the FCF device 204 using a cable (e.g., an optical cable, a copper wire cable, and/or other cabling) and/or other coupling system that would be apparent to one of skill in the art in possession of the present disclosure. In an embodiment, the FC storage system 208 includes a target communication system 208a (e.g., an HBA) that is coupled to the FC switch 206 using a cable or other coupling system known in the art. One of skill in the art in possession of the present disclosure will recognize that the use of "initiator" and "target" with reference to the communication systems 202a and 208a is provided for clarity of discussion with regard to the example of server/storage communications discussed below, and different communication scenarios will fall within the scope of the present disclosure as well.

As discussed below, each of the server device 202 and the FC storage system 208 may include memory systems that include instructions that, when executed by processing systems in the server device 202 or FC storage system 208, cause the processing systems to communicate using FC protocols and, in some instances, partially with FCoE protocols, in order to, for example, transport Small Computer System Interface (SCSI) commands over a FC network (e.g., the FC fabric including the FCF device 204 and FC switch 206) provided between them. While a specific simulated FC trunking system 200 is illustrated and described below, one of skill in the art in possession of the present disclosure will recognize that the teachings of the present disclosure will be beneficial for a variety of FC systems that would be apparent to one of skill in the art in possession of the present disclosure and, as such, a wide variety of modifications to the number, types, and orientation of devices in the simulated FC trunking system 200 will fall within the scope of the present disclosure as well.

Figure 3:
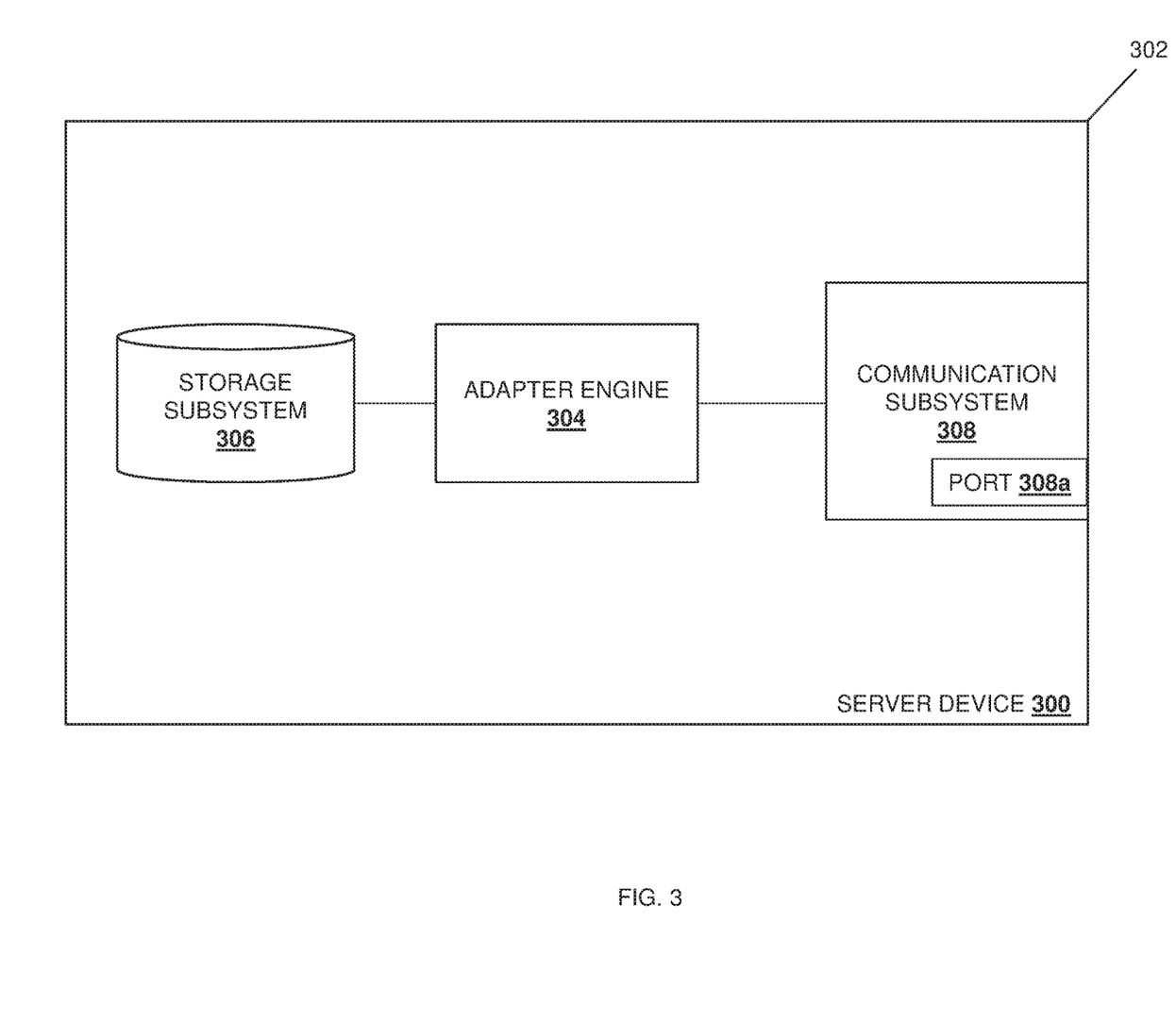
FIG. 3 is a schematic view illustrating an embodiment of a server device in the simulated FC trunking system of FIG. 2.

Referring now to FIG. 3, an embodiment of a server device 300 is illustrated that may be the server device discussed above with reference to FIG. 2. As such, the server device 300 may be the IHS 100 discussed above with reference to FIG. 1 and/or may include some or all of the components of the IHS 100, and in specific examples may be one or more servers in a server rack or server chassis. In the illustrated embodiment, the server device 300 includes a chassis 302 that houses the components of the server device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an adapter engine 304 that is configured to perform the functions of the adapter engines and server devices discussed below.

The chassis 302 may also house a storage system (not illustrated, but which may include the storage device 108 discussed above with reference to FIG. 1) that is coupled to the adapter engine 304 (e.g., via a coupling between the storage system and the processing system) and that may include a storage subsystem 306 that is configured to store the data utilized as discussed below. However, in some embodiments the storage subsystem 306 may be omitted. The chassis 302 may also house a communication subsystem 308 that may be the initiator communication system 202a discussed above with reference to FIG. 2, that is coupled to the adapter engine 304 (e.g., via a coupling between the communication subsystem 308 and the processing system), and that may include a Network Interface Controller (NIC), a wireless communication devices, one or more ports (e.g., a port 308a), and/or other communication components that would be apparent to one of skill in the art in possession of the present disclosure. Furthermore, in some embodiments, components of the adapter engine 304 and/or the communication subsystem 308 may be provided by a Converged Network Adapter (CNA) that performs the functionality of the adapter engines and/or server devices discussed below. However, in other embodiments, the adapter engine 304 and/or communication subsystem 308 may be utilized to provide other types of adapters (e.g., Host Bus Adapters (HBAs)) while remaining within the scope of the present disclosure as well. While a specific server device 300 has been described, one of skill in the art in possession of the present disclosure will recognize that the server device 300 may include a variety of other components that perform conventional server device functionality, as well as the functionality described below, while remaining within the scope of the present disclosure.

Figure 4:
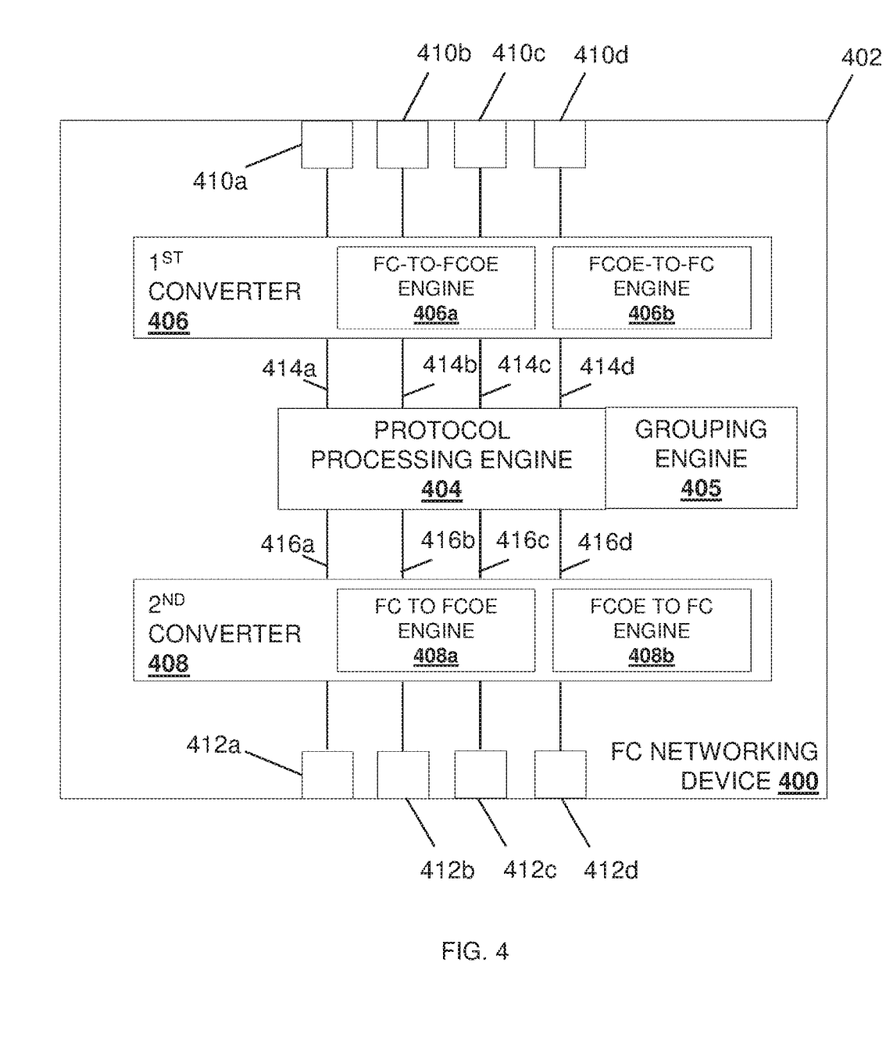
FIG. 4 is a schematic view illustrating an embodiment of an FC networking device in the simulated FC trunking system of FIG. 2.

Referring now to FIG. 4, an embodiment of a Fibre Channel (FC) networking device 400 is illustrated that may be the FCF device 204 or the FC switch 206 discussed above with reference to FIG. 2. As such, the FC networking device 400 may be, for example, the IHS 100 discussed above with reference to FIG. 1, and/or which may include some or all of the components of the IHS 100. In the illustrated embodiment, the FC networking device 400 includes a chassis 402 that houses the components of the FC networking device 400, only some of which are illustrated in FIG. 4. For example, the chassis 402 may include a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an protocol processing engine 404 that is configured to perform the functions of the protocol processing engines and FC networking devices discussed below.

In another example, the memory system may include instructions that, when executed by the processing system, cause the processing system to provide a grouping engine 405 that is configured to perform the functions of the grouping engines and FC networking devices discussed below. In an embodiment, the processing system that provides the protocol processing engine 404 includes an Ethernet switch processor (e.g., an Ethernet switch chip such as, for example, an Ethernet switch Application Specific Integrated Circuit (ASIC)), and a Central Processing Unit (CPU). In a specific example, the protocol processing engine 404 may be provided by the Ethernet switch processor, and the grouping engine 405 may be provided by the CPU. While in the embodiments discussed below, specific actions are discussed as being performed by the CPU and the Ethernet switch processor, in different embodiments, the actions performed by the CPU may be performed by the Ethernet switch processor and/or some other processing system (e.g., a processing system that performs the actions of both the CPU and the Ethernet switch processor) while remaining within the scope of the present disclosure. In an embodiment, the memory system that includes the instructions for providing the protocol processing engine 404 may include Ethernet layer 2 (L2) forwarding tables. In a specific example, the processing system may execute instructions included on the included on the memory system to provide an N_Port ID Virtualization (NPIV) Proxy Gateway (NPG) engine that operates as discussed below.

In some FC networking devices, FC fabrics utilize FC switch devices that include expensive and proprietary FC switch chips, and the simulated FC trunking system 200 of the present disclosure may provide at least a portion of an FC fabric that includes the FC networking device 400 with an Ethernet switch processor that one of skill in the art will recognize is relatively inexpensive compared to the FC switch chips discussed above due to, for example, the widespread use of Ethernet switch processors in a variety of networking applications and the resulting economies of scale. In the embodiments discussed in further detail below, the FC networking device 400 may provide for the transmission of FC data traffic between server devices and storage devices utilizing an Ethernet switch processor (which operates via a different Open System Interconnect (OSI) physical layer than FC switch chips included in conventional FC switches) along with the converters and software stack discussed below. As discussed above, the processing system that provides the protocol processing engine 404 may also include a Central Processing Unit (CPU) that handles, for example, control protocols and configuration of the FC networking device 400 including, for example, providing the grouping engine 405, while the Ethernet switch processor performs data traffic processing and forwarding.

The FC networking device 400 includes a converter 406 that may include, for example, at least one FC PHY chip and a memory system that includes instructions that, when executed by the at least one FC PHY chip, cause the at least one FC PHY chip to provide an FC-to-FCoE engine 406a, an FCoE-to-FC engine 406b, and/or perform any of the other functions of the converter 406 discussed below. As described below, the FC-to-FCoE engine 406a and/or the FCoE-to-FC engine 406b may operate as FC/FCoE encapsulator/decapsultors at the physical (PHY) layer, providing an FC port-level state machine, framing, and PHY level FC/FCoE conversion. The FC networking device 400 also includes a converter 408 that may include, for example, an FC PHY chip and a memory system that includes instructions that, when executed by the FC PHY chip, cause the FC PHY chip to provide an FC-to-FCoE engine 408a, an FCoE-to-FC engine 408b, and/or perform any of the other functions of the converter 408 discussed below. As described below, the FC-to-FCoE engine 408a and/or the FCoE-to-FC engine 408b may operate as FCoE/FC encapsulator/decapsultors at the PHY layer, providing an FC port-level state machine, framing, and PHY level FCoE/FC conversion.

The converter 406 is coupled to a plurality of ports (e.g., a port 410a, a port 410b, a port 410c, and up to a port 410d) on the FC networking device 400, and the converter 408 is coupled to a plurality of ports (e.g. a port 412a, a port 412b, a port 412c, and up to a port 412d) on the FC networking device 400. In an embodiment, each of the plurality of ports 410a-410d may be coupled to a respective FC PHY chip that is provided in the converter 406, and each of the plurality of ports 412a-412d may be coupled to a respective FC PHY chip that is provided in the converter 408. In some embodiments, the ports 410a-410d may be ports configured for FC communication and/or ports configured for FCoE communication. The converter 406 may be coupled to the Ethernet switch processor via plurality of links (e.g., a link 414a, a link 414b, a link 414c, and up to a link 414d), and the converter 408 may be coupled to protocol processing engine 404 via a plurality of links (e.g., a link 416a, a link 416b, a link 416c, and up to a link 416d). Each link 414a-414d and 416a-416d may be configured to provide FCoE traffic, and may be referred to herein as an Ethernet link. In an embodiment, each of the plurality of links 414a-414d may be coupled to a respective FC PHY chip that is provided in the converter 406, and a respective internal port of the Ethernet switch processor, while each of the plurality of links 416a-416d may be coupled to a respective FC PHY chip that is provided in the converter 408, and a respective internal port of the Ethernet switch processor. In embodiments where the ports 410a, 410b, 410c, and/or 410d are configured for FCoE communication, the converter 406 may be omitted, and the ports 410a, 410b, 410c, and/or 410d may be coupled directly to the Ethernet switch processor via a respective link 414a, 414b, 414c, and/or 414d.

Figure 5:
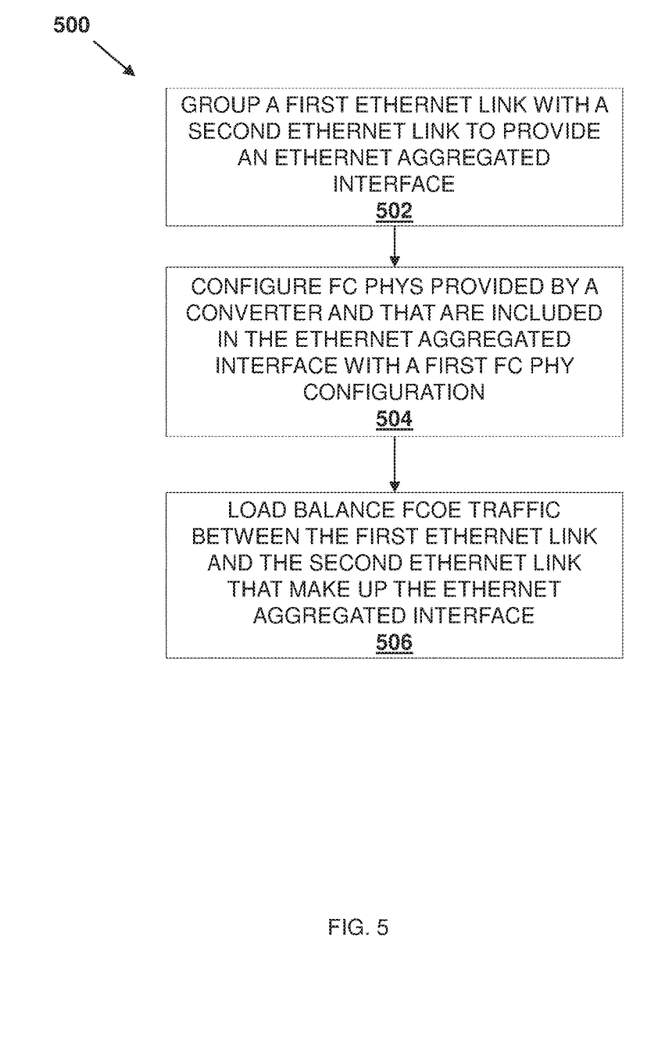
FIG. 5 is a flow chart illustrating an embodiment of a method for simulating FC trunking using Ethernet links.

Referring now to FIG. 5, an embodiment of a method 500 for simulating Fibre Channel (FC) trunking using Ethernet links is illustrated. As discussed above, a plurality of FC links may be provided between two FC networking devices such as, for example, an FCF and an FC switch. In conventional FC trunking systems, these FC links may be trunked or otherwise grouped together using a link aggregation protocol to form a trunk group that aggregates the FC links such that they are recognized as a single interface. However, trunking the FC links requires FC level handshaking operations such as logging in the various N_Ports of the FCF with the F_Ports of the FC switch. Furthermore, in conventional FC SANs, traffic to and from servers is provided only on the physical FC link used by the server to log in with the FC SAN, which results in uneven traffic balancing or underutilization of available bandwidth on other physical links available between the FCF and the FC switch. The systems and method of the present disclosure remedy these deficiencies by grouping, in FC networking devices that process FC traffic using an Ethernet switch processor (e.g., an Ethernet network processing unit (NPU)), Ethernet links between the Ethernet switch processor and FC PHY chips that provide FC-to-FCoE conversion for ingress traffic and FCoE-to-FC conversion for egress traffic, and presenting the grouped Ethernet links as a single interface. The grouped Ethernet links can simulate an FC trunk group including the FC links between the FCF device and the FC switch because each of the Ethernet links are mapped to a respective FC link between the FCF device and the FC switch. The protocol processing engine may then load balance the FCoE traffic across the grouped Ethernet links using a hashing algorithm, which in turn is converted to FC traffic at the FC PHY chip and provided on its respective FC link. As such, simulated "FC trunking" occurs, and the drawbacks related to FC level handshaking operations associated with forming an FC trunk group using an expensive, proprietary FC switch chip in conventional systems are reduced.

Figure 6:
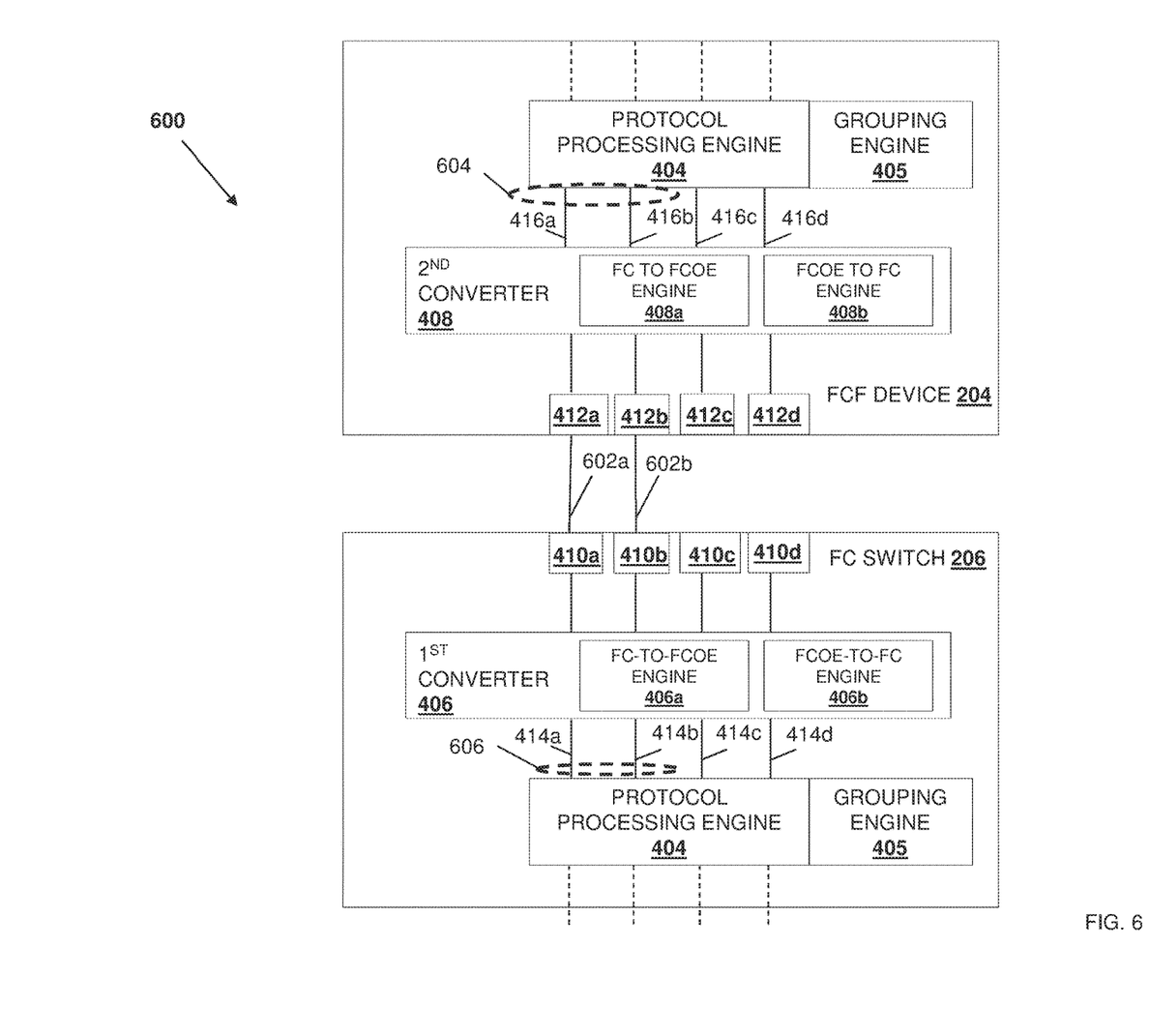
FIG. 6 is a schematic view illustrating an embodiment of the simulated FC trunking system of FIG. 2 during the method of FIG. 5.

The method 500 begins at block 502 where a plurality of Ethernet links between an Ethernet switch processor and FC PHY converter are grouped together as an aggregated interface. In an embodiment of block 502, and with reference to a simulated FC trunking system 600 of FIG. 6 (which may be provided in an embodiment of the simulated FC trunking system 200 referenced above in FIG. 2), the FCF device 204 may be coupled to the FC switch 206 via FC links 602a and 602b (which may be the FC links 205a and 205b referenced above in FIG. 2.) For example, the port 412a of the FCF device 204 may be coupled to the port 410a of the FC switch 206 via the FC link 602a, and the port 412b of the FCF device 204 may be coupled to the port 410b of the FC switch 206 via the FC link 602b. In various embodiments, the ports 412c and 412d may not be coupled to the FC switch 206, as illustrated in FIG. 6. In the illustrated example, the ports 412a and 412b of the FCF device 204 are N_Ports, while the ports 410a-410b of the FC switch 206 are F_Ports. In conventional FC trunking systems, the links 602a and 602b may be grouped together as a trunk group that is presented as a single interface to the server device 202 and/or the FC storage system 208. For example, the FCF device 204 may group the ports 412a and 412b, and the FC switch 206 may group the ports 410a and 410b. However, as discussed above, trunking or otherwise aggregating FC links provides a number of drawbacks when compared to aggregating Ethernet links.

As such, in an embodiment of block 502, the grouping engine 405 of the FCF device 204 aggregates the Ethernet links 416a and 416b between the converter 408 and the protocol processing engine 404 provided by the Ethernet switch processor. For example, the grouping engine 405 of the FCF device 204 may group the internal ports of the Ethernet switch processor that are mapped to the FC PHYs that are both provided by the converter 408 and coupled to the ports 412a and 412b that would otherwise make up a FC trunk group between the FCF device 204 and the FC switch 206. As illustrated, the grouping of the internal ports of the Ethernet switch processor in the FCF device 204 may form an Ethernet aggregated interface 604. Similarly, the grouping engine 405 provided by the FC switch 206 may group the internal ports of the Ethernet switch processor that are mapped to the FC PHYs that are provided by the converter 406 and coupled to the ports 410a and 410b that would otherwise make up FC trunk group between the FCF device 204 and the FC switch 206. As illustrated, the grouping of the internal ports of the Ethernet switch processor in the FC switch 206 may form an Ethernet aggregated interface 606.

In an example, the grouping engine 405 may group internal ports of the Ethernet switch processor in the FCF device 204 and the FC switch 206 according to an aggregation protocol such that the aggregated interface 606 may be a static link aggregation group (LAG). In various embodiments, the grouping engine 405 may group the internal ports to provide the Ethernet aggregated interfaces 604 and 606 according to an aggregation command that is provided by an administrator via, for example, a command line interface and that configures a Ethernet link aggregation table that includes an identifier assigned to the Ethernet aggregated interface 604 or 606, port identifiers of the internal ports of the Ethernet switch processor that are included in the Ethernet aggregated interface 604 or 606, and/or any other Ethernet aggregated interface information that would be apparent to one of skill in the art in possession of the present disclosure.

The method 500 may then proceed to block 504 where the FC PHYs that are provided by the converter and that are included in the Ethernet aggregated interface are configured with the same FC PHY configuration. In an embodiment of block 504, and with reference to the simulated FC trunking system 600 of FIG. 6, the grouping engine 405 of the FCF device 204 may configure the FC PHYs of the ports 412a and 412b, which are mapped to the internal ports of the Ethernet switch processor that are provided in the Ethernet aggregated interface 604, with the same FC PHY configurations. For example, the FC PHYs of the Ethernet aggregated interface 604 may be configured with the same vfabric configuration provided by a vfabric configuration file. In some examples, the vfabric configuration file may include an FCoE virtual local area network (VLAN) (FCoE VLAN) field, an FCoE MAC address prefix (FCoE FCMAP) field, and/or any other FC PHY configuration fields that would be apparent to one of skill in the art in possession of the present disclosure. Each of these FC PHY configuration fields provides a FC PHY configuration value (e.g., FCoE VLAN: "1001", FCoE FCoE FCMAP: "0XEFC00"). In an embodiment, FC PHY configuration values for corresponding FC PHY configuration fields may be the same for each FC PHY of the Ethernet aggregated interface 604.

Similarly, the grouping engine 405 of the FC switch 206 may configure the FC PHYs of the ports 410a and 410b, which are mapped to the internal ports of the Ethernet switch processor that are provided in the Ethernet aggregated interface 606, with the same FC PHY configurations. For example, the FC PHYs of the Ethernet aggregated interface 606 may be configured with the same vfabric configuration provided by a vfabric configuration file. In some examples, the vfabric configuration file may include an FCoE VLAN field, an FCoE FCMAP field, and/or any other FC PHY configuration fields that would be apparent to one of skill in the art in possession of the present disclosure. Each of these FC PHY configuration fields provides a FC PHY configuration value (e.g., FCoE VLAN: "1001", FCoE FCoE FCMAP: "0XEFC00"). In an embodiment, FC PHY configuration values for corresponding FC PHY configuration fields may be the same for each FC PHY of the Ethernet aggregated interface 606. In an embodiment, the FC PHY configurations of the FC PHYs of the Ethernet aggregated interface 606 may be the same as the FC PHY configurations of the FC PHYs of the Ethernet aggregated interface 604.

In various embodiments, upon successful fabric login between the FCF device 204 and the FC switch 206, buffer-to-buffer credits (BB_credits) may be programmed on all FC PHYs that are included on the aggregated interfaces 602 and/or 604. As would be understood by one of skill in the art in possession of the present disclosure, BB_credits are a flow-control mechanism that operates to ensure that FC interfaces do not drop frames, and are negotiated on a per-hop basis. In some embodiments, the BB_credits may only be used on FC PHYs, but not on virtual Fibre Channel interfaces.

The method 500 may proceed to block 506 where the Fibre Channel over Ethernet (FCoE) traffic that is provided by the Ethernet switch processor is load balanced between the first Ethernet link and the second Ethernet link. In an embodiment of block 506, and with reference to the simulated FC trunking system 600 in FIG. 6, egress FCoE traffic from the protocol processing engine 404 of the Ethernet switch processor may be load balanced by the grouping engine 405. The grouping engine 405 may include one or more load balancing algorithms that may be selected based on the role of the FC networking device 400. For example, an FCF device load balancing algorithm may be selected when the FC networking device 400 is the FCF device 204, and an FC switch load balancing algorithm may be selected when the FC networking device 400 is the FC switch 206. In a specific example, the FCF device load balancing algorithm may provide for the recognition of FCoE traffic at the Ethernet switch processor that is destined for a target communication system 208a that is coupled to the FCF device 204 through the FC switch 206, and cause the Ethernet aggregated interface 604 to be utilized. Furthermore, the FCF device load balancing algorithm may provide for the load balancing or the hashing of egress FCoE traffic received over the Ethernet links 416a and 416b from the Ethernet switch processor based on a source identifier included in the FCoE traffic that identifies the source of the FCoE traffic. For example, if the server device 202 includes a plurality of servers that each have their own server identifier (e.g., a server MAC address), FCoE traffic that originates from a server in the server device 202 and that includes an odd numbered MAC address may be provided on the Ethernet link 416a, while FCoE traffic that originates from a server with an even numbered MAC address may be provided on the Ethernet link 416b. In another example, particular source identifiers may be assigned to specific Ethernet links (e.g., either of the links I in the Ethernet aggregated interface 606.) In other examples, the FCF load balancing algorithm may provide for the performance of exchange based hashing on the egress FCoE traffic. While specific FCF device load balancing algorithms have been described, one of skill in the art in possession of the present disclosure would recognize that other hashing/load balancing algorithms may be used without departing from the scope of the present disclosure.

In the simulated FC trunking system 600 illustrated in FIG. 6, the FCoE traffic that is provided on the Ethernet link 416a may be converted to FC traffic by the FCoE-to-FC engine 408b provided by the FC PHY included in the converter 408 that is coupled to the Ethernet link 416a. The FC traffic may then be transmitted via the port 412a that is mapped to the Ethernet link 416a, and provided over the FC link 602a. The FC switch 206 may receive the FC traffic on the port 410a, and provide the FC traffic to the FC PHY of the converter 406 for the port 410a. The FC-to-FCoE engine 406a may convert the FC traffic to FCoE traffic, and provide the FCoE traffic to the protocol processing engine 404 of the FC switch 206 via the Ethernet link 414a. The protocol processing engine 404 may then process the FCoE traffic and provided it to the converter 408 of the FC switch 206 (not illustrated in FIG. 6). The converter 408 of the FC switch

206 may then convert the FCoE traffic to FC traffic and provide it to the FC storage system 208.

Similarly, the FCoE traffic that is provided on the Ethernet link 416b may be converted to FC traffic by the FCoE-to-FC engine 408b provided by the FC PHY included in the converter 408 that is coupled to the Ethernet link 416b. The FC traffic may then be transmitted via the port 412b that is mapped to the Ethernet link 416b, and provided over the FC link 602b. The FC switch 206 may then receive the FC traffic on the port 410b and provide the FC traffic to the FC PHY of the converter 406 for the port 410b. The FC-to-FCoE engine 406a may then convert the FC traffic to FCoE traffic, and provide the FCoE traffic to the protocol processing engine 404 of the FC switch 206 via the Ethernet link 414b. The protocol processing engine 404 may then process the FCoE traffic, and provide the FCoE traffic to the converter 408 of the FC switch 206. The converter 408 of the FC switch 206 may then convert the FCoE traffic to FC traffic and provide it to the FC storage system 208.

In another example, when the FC networking device 400 is the FC switch 206, the FC switch load balancing algorithm may be selected. The FC switch load balancing algorithm may provide for the recognition of FCoE traffic at the Ethernet switch processor of the FC switch 206 that is destined for an initiator communication system 202a that is coupled to the FC switch 206 through the FCF device 204, and thus the utilization of the Ethernet aggregated interface 606 of the FC switch 206. The FC switch load balancing algorithm may then provide for load balancing or hashing of egress FCoE traffic over the Ethernet links 414a and 414b from the Ethernet switch processor of the FC switch 206 based on a destination identifier included in the FCoE traffic that identifies the destination of the FCoE traffic. For example, if the server device 202 includes a plurality of servers that each have their own server identifier (e.g., a server MAC address), FCoE traffic destined to a server of the server device 202 with an odd numbered MAC address may be provided on the Ethernet link 414a, while the FCoE traffic destined to a server with an even numbered MAC address may be provided on the Ethernet link 414b. In another example, particular destination identifiers may be assigned to specific Ethernet links of the Ethernet aggregated interface 606. In other examples, the FC switch load balancing algorithm may provide for the performance of exchange based hashing on the egress FCoE traffic. While specific FC switch load balancing algorithms have been described, one of skill in the art in possession of the present disclosure will recognize that other hashing/load balancing algorithms may be used without departing from the scope of the present disclosure.

In the simulated FC trunking system 600 illustrated in FIG. 6, the FCoE traffic that is provided on the Ethernet link 414a may be converted to FC traffic by the FCoE-to-FC engine 406b provided by the FC PHY included in the converter 406 that is coupled to the Ethernet link 414a of the FC switch 206. The FC traffic may then be transmitted via the port 410a that is mapped to the Ethernet link 414a, and provided over the FC link 602a. The FCF device 204 may then receive the FC traffic on the port 412a, and provide the FC traffic to the FC PHY of the converter 408 coupled to the port 412a. The FC-to-FCoE engine 408a may then convert the FC traffic to FCoE traffic, and provide the FCoE traffic to the protocol processing engine 404 of the FCF device 204 via the Ethernet link 416a. The protocol processing engine 404 may then process the FCoE traffic, and provided it to the converter 406 of the FCF device 204 (not illustrated in FIG. 6). The converter 406 of the FCF device 204 may then convert the FCoE traffic to FC traffic, and provide it to the server device 202. However, in other embodiments, the protocol processing engine 404 may send the FCoE traffic directly to the server device 202 without converting the FCoE traffic to FC traffic.

Similarly, the FCoE traffic that is provided on the Ethernet link 414b may be converted to FC traffic by the FCoE-to-FC engine 406b provided by the FC PHY included in the converter 406 that is coupled to the Ethernet link 414b. The FC traffic may then be transmitted via the port 410b of the FC switch 206 that is mapped to the Ethernet link 414b, and provided over the FC link 602b. The FCF device 204 may then receive the FC traffic on the port 412b, and provide the FC traffic to the FC PHY of the converter 408 coupled to the port 412b. The FC-to-FCoE engine 408a may then convert the FC traffic to FCoE traffic, and provide the FCoE traffic to the protocol processing engine 404 of the FCF device 204 via the Ethernet link 416b. The protocol processing engine 404 may then process the FCoE traffic, and provide the FCoE to the converter 406 of the FCF device 204. The converter 406 of the FCF device 204 may then convert the FCoE traffic to FC traffic, and provide it to the FC storage system 208. However, in other embodiments, the protocol processing engine 404 may send the FCoE traffic directly to the server device 202 without converting the FCoE traffic to FC traffic.

Thus, systems and methods have been described that provide for simulated FC trunking in FC networking devices that include an Ethernet switch processor by grouping internal Ethernet ports of the Ethernet switch processor that provide Ethernet links between the Ethernet switch processor and the FC PHYs that convert FCoE traffic to FC traffic before being provided over a FC link to another FC networking device. After aggregating the Ethernet links to form an Ethernet aggregated interface, FCoE traffic may be load balanced on the Ethernet links of the Ethernet aggregated interface, and provided as FC traffic over FC links (which would otherwise be grouped in conventional FC trunking systems) to other FC networking devices. The grouped Ethernet links simulate the FC trunking without the FC level handshaking operations required in conventional FC trunking systems, which eliminates the need for expensive, proprietary FC switch chips that are complex and inefficient.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel (FC) networking system, comprising:
   a server device;
   a Fibre Channel (FC) storage system;
   a first FC networking device that is coupled to the FC storage system via a first FC link; and
   a second FC networking device that is coupled to the server device and that includes:
      a first FC PHY converter that is coupled to the first FC networking device via a second FC link and a third FC link; and
      a first Ethernet switch processor that is coupled to:
         the server device; and
         the first FC PHY converter via a plurality of Ethernet links that include:

a first Ethernet link that is mapped to the second FC link and that is provided between the first Ethernet switch processor and the first FC PHY converter; and a second Ethernet link that is mapped to the third FC link and that is provided between the first Ethernet switch processor and the first FC PHY converter, wherein the second FC networking device is configured to:

group the first Ethernet link with the second Ethernet link to provide an aggregated interface that is associated with an aggregated interface identifier that is used to advertise the aggregated interface as a single interface; and load balance Fibre Channel over Ethernet (FCoE) traffic, which is provided by the first Ethernet switch processor to the aggregated interface based on the aggregated interface identifier, between the first Ethernet link and the second Ethernet link, wherein the load balancing of the FCoE traffic, the mapping of the first Ethernet link to the second FC link, and the mapping of the second Ethernet link to the third FC link causes a first portion of the FCoE traffic that is load balanced on the first Ethernet link and converted by the first FC PHY to first FC traffic to be provided on the second FC link, and a second portion of the FCoE traffic that is load balanced on the second Ethernet link and converted by the first FC PHY to second FC traffic to be provided on the third FC link.

2. The FC networking system of claim 1, wherein the second FC networking device further includes:
a second FC PHY converter that is coupled to:
the server device via a fourth FC link; and
the first Ethernet switch processor via a third Ethernet link.

3. The FC networking system of claim 2, wherein the first FC PHY converter and the second FC PHY converter are configured to convert FC traffic to FCoE traffic, and convert FCoE traffic to FC traffic.

4. The FC networking system of claim 1, wherein the second FC networking device is further configured to:
apply a first FC PHY configuration to a first FC PHY that is included in the first FC PHY converter and that is coupled to the first Ethernet link; and
apply the first FC PHY configuration to a second FC PHY that is included in the first FC PHY converter and that is coupled to the second Ethernet link.

5. The FC networking system of claim 1, wherein the load balancing is performed by hashing the FCoE traffic based on a source device identifier.

6. The FC networking system of claim 1, wherein the first FC networking device includes:
a first networking device FC PHY converter that is coupled to the second FC link and the third FC link; and
a first FC networking device Ethernet switch processor that is coupled to:
the FC storage system; and
the first FC networking device FC PHY converter via a plurality of Ethernet links that include:
a first FC networking device first Ethernet link that is mapped to the second FC link and that is provided between the first FC networking device Ethernet switch processor and the first FC networking device FC PHY converter; and
a first FC networking device second Ethernet link that is mapped to the third FC link and that is provided between the first FC networking device Ethernet switch processor and the first FC networking device FC PHY converter, wherein the first FC networking device is configured to:
group the first FC networking device first Ethernet link and the first FC networking device second Ethernet link to provide an aggregated interface; and
load balance Fibre Channel over Ethernet (FCoE) traffic that is provided by the first FC networking device Ethernet switch processor between the first FC networking device first Ethernet link and the first FC networking device second Ethernet link.

7. The FC networking system of claim 1, wherein the load balancing is performed by hashing the FCoE traffic based on a destination device identifier.

8. An Information Handling system (IHS), comprising:
a plurality of Fibre Channel (FC) ports;
a first FC PHY converter that is coupled to the plurality of FC ports;
a processing system that includes an Ethernet switch processor that is coupled to the first FC PHY converter via a plurality of Ethernet links that include:
a first Ethernet link that is mapped to a first FC port of the plurality of FC ports and that is provided between the Ethernet switch processor and the first FC PHY converter; and
a second Ethernet link that is mapped to a second FC port of the plurality of FC ports and that is provided between the Ethernet switch processor and the first FC PHY converter; and
a memory system that is coupled to the processing system and that includes instructions that, when executed by the processing system, cause the processing system to provide a grouping engine that is configured to:
group the first Ethernet link with the second Ethernet link to provide an aggregated interface that is associated with an aggregated interface identifier that is used to advertise the aggregated interface as a single interface; and
load balance Fibre Channel over Ethernet (FCoE) traffic, which is provided by the Ethernet switch processor to the aggregated interface based on the aggregated interface identifier, between the first Ethernet link and the second Ethernet link, wherein the load balancing of the FCoE traffic, the mapping of the first Ethernet link to the first FC port, and the mapping of the second Ethernet link to the second FC port causes a first portion of the FCoE traffic that is load balanced on the first Ethernet link and converted by the first FC PHY to first FC traffic to be provided on the first FC port, and a second portion of the FCoE traffic that is load balanced on the second Ethernet link and converted by the first FC PHY to first FC traffic to be provided on the second FC port.

9. The IHS of claim 8, further comprising:
a second FC PHY converter that is coupled to the Ethernet switch processor via a third Ethernet link.

10. The IHS of claim 9, wherein the first FC PHY converter and the second FC PHY converter are configured to convert FC traffic to FCoE traffic, and convert FCoE traffic to FC traffic.

11. The IHS of claim 8, wherein the grouping engine is further configured to:
apply a first FC PHY configuration to a first FC PHY that is included in the first FC PHY converter and that is coupled to the first Ethernet link; and apply the first FC PHY configuration to a second FC PHY that is included in the first FC PHY converter and that is coupled to the second Ethernet link.

12. The IHS of claim 8, wherein the load balancing is performed by hashing the FCoE traffic based on a source device identifier include in the FCoE traffic.

13. The IHS of claim 8, wherein the load balancing is performed by hashing the FCoE traffic based on a destination device identifier include in the FCoE traffic.

14. The IHS of claim 8, wherein the FCoE traffic that is provided by the Ethernet switch processor on the first Ethernet link is provided as FC traffic through the first FC port and the FCoE traffic that is provided by the Ethernet switch processor on the second Ethernet link is provided as FC traffic through the second FC port.

15. A method of emulating Fibre Channel (FC) trunking: comprising:
   grouping, by a FC networking device, a first Ethernet link with a second Ethernet link that are provided between an Ethernet switch processor and a first FC PHY converter included in the FC networking device to provide an aggregated interface that is associated with an aggregated interface identifier that is used to advertise the aggregated interface as a single interface;
   load balancing, by the FC networking device using the Ethernet switch processor to the aggregated interface based on the aggregated interface identifier, Fibre Channel over Ethernet (FCoE) traffic that is provided between the first Ethernet link and the second Ethernet link;
   converting, by the FC networking device using the FC PHY converter, a first portion of the FCoE traffic load balanced on the first Ethernet link to first FC traffic;
   providing, by the FC networking device, the first FC traffic to a first FC port that is coupled to the first FC PHY converter and that is mapped to the first Ethernet link;
   converting, by the FC networking device using the FC PHY converter, a second portion of the FCoE traffic load balanced on the second Ethernet link to second FC traffic; and
   providing, by the FC networking device, the second FC traffic to a second FC port that is coupled to the first FC PHY converter and that is mapped to the second Ethernet link.

16. The method of claim 15, further comprising:
   applying, by the FC networking device, a first FC PHY configuration to a first FC PHY that is included in the first FC PHY converter and that is coupled to the first Ethernet link; and
   applying, by the FC networking device, the first FC PHY configuration to a second FC PHY that is included in the first FC PHY converter and that is coupled to the second Ethernet link.

17. The method of claim 15, wherein the load balancing is performed by hashing the FCoE traffic based on a source device identifier include in the FCoE traffic.

18. The method of claim 15, wherein the load balancing is performed by hashing the FCoE traffic based on a destination device identifier include in the FCoE traffic.

19. The method of claim 15, further comprising:
   receiving, by the FC networking device at the Ethernet switch processor, FCoE traffic from a second FC converter; and
   performing, by the FC networking device using the Ethernet switch processor, Ethernet traffic switch functions on the FCoE traffic.

\* \* \* \* \*